UNITED STATES PATENT OFFICE.

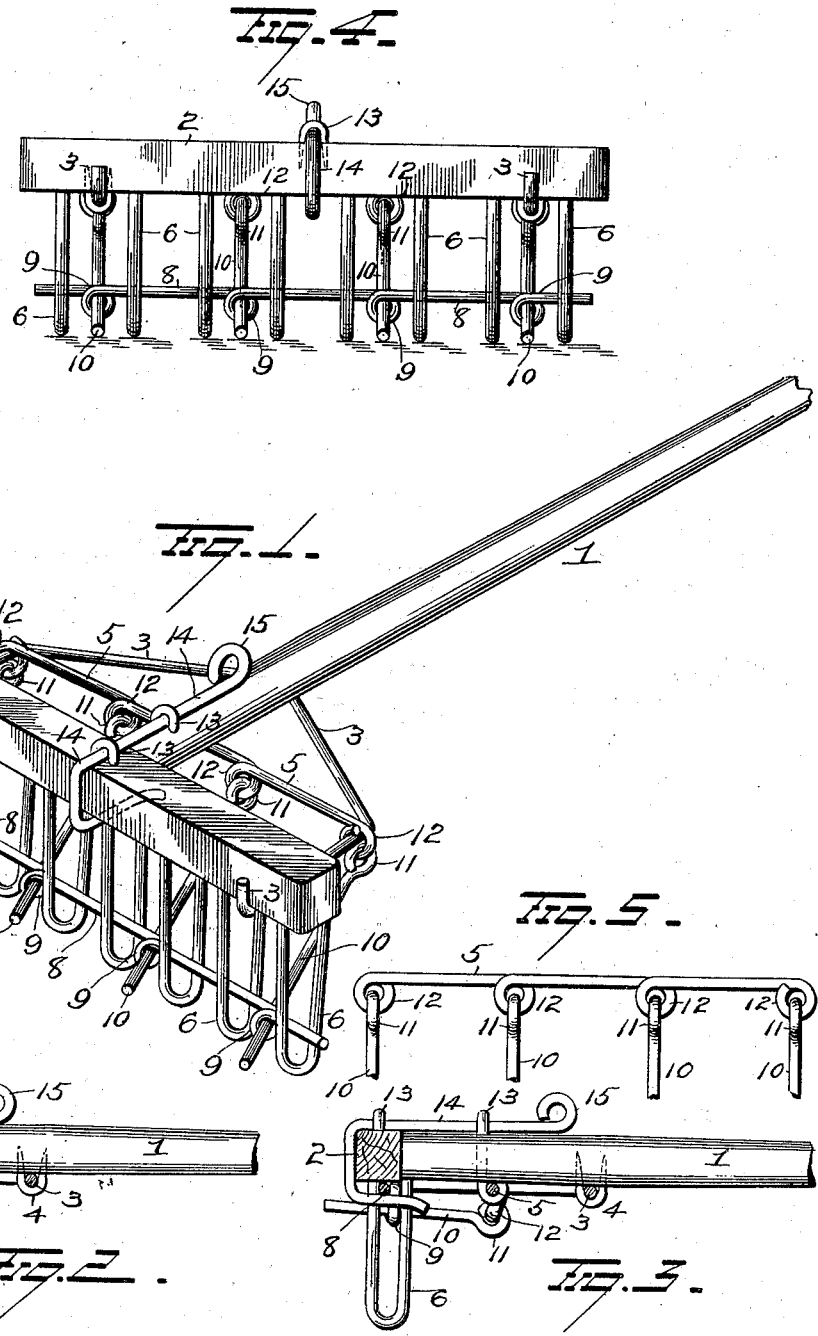

LE GRAND TERRY, OF WAVERLY, NEW YORK.

RAKE.

SPECIFICATION forming part of Letters Patent No. 708,939, dated September 9, 1902.

Application filed January 18, 1902. Serial No. 90,362. (No model.)

*To all whom it may concern:*

Be it known that I, LE GRAND TERRY, a resident of Waverly, in the county of Tioga and State of New York, have invented certain new and useful Improvements in Rakes; and I do hereby declare the following to be a full, clear, and exact description of the invention, such as will enable others skilled in the art to which it appertains to make and use the same.

My invention relates to an improvement in rakes, and more particularly to an improved attachment therefor, the object of the invention being to provide improved devices for preventing the entanglement of grass and the like about the teeth of the rake.

With this object in view the invention consists in certain novel features of construction and combinations and arrangements of parts, as will be more fully hereinafter described, and pointed out in the claims.

In the accompanying drawings, Figure 1 is a perspective view illustrating my improvements. Figs. 2 and 3 are views in section of the same, and Figs. 4 and 5 are enlarged views of details of construction.

1 represents a rake-handle, and 2 a crosshead secured thereto, both being preferably of wood, although one or both may be of metal, if desired. A metal frame 3, preferably of wire, is secured between its ends to the under face of handle 1 by a staple 4 and then extends outward and toward the crosshead, and the ends are bent sharply and extend parallel rearward and are secured to the cross-head by staples, as shown, or by any other means, and this frame 3 not only serves as a brace for the rake, but also as a support for a cross-rod 5, as will more fully hereinafter appear. The cross-head 2 is provided with a series of teeth 6, each composed, preferably, of wire bent upon itself between its ends. The rear member of the tooth projects into the bottom of the cross-head, and the forward member is bent sharply at right angles, projects into the front face of the crosshead, and is secured therein by a staple 7. Disposed parallel with the cross-head and located below the same and extending through all of the teeth 6 is a bar 8, composed, preferably, of wire bent at intervals throughout its length into eyes or loops 9, disposed between teeth of the rake and adapted to receive rearwardly-projecting arms or fingers 10, having hooks 11 at their forward ends to movably secure them in eyes or loops 12 in the cross-rod 5 above referred to. On the upper face of handle 1 and cross-head 2 alined staples 13 are provided to support a longitudinally-movable wire catch 14, having a handle or finger-hold 15 at one end and the rear or free end bent into hook shape projecting under the cross-head and adapted to engage the bar 8 and support the same and arms 10 in their raised or elevated position.

With my improvements attached to a rake the bar 8 and arms 10 will prevent the entanglement of grass and the like around the teeth, and when the rake is to be packed for shipment or is not in use the bar 8 and arms 10 can be held against movement by catch 14, as above explained.

Various slight changes might be resorted to in the general form and arrangement of the several parts described without departing from the spirit and scope of my invention, and hence I would have it understood that I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a rake, the combination with a handle and a cross-head secured thereto, of teeth secured to the cross-head and having front and rear members, a bar projecting through said teeth, and pivoted arms connected with the handle and projecting into eyes or loops in said bar.

2. In a rake, the combination with a handle and a cross-head secured thereto, of teeth secured to the cross-head and each comprising a wire bent between its ends, one end projecting into the bottom of the cross-head and the other into the side face thereof, a frame connected at its ends to the cross-head and between its ends to the handle, a rod carried by said frame disposed parallel with the crosshead, a bar projecting through the rake-teeth and having eyes at intervals throughout its length, and arms pivotally connected to said rod and projecting into the eyes in said bar.

3. In a rake, the combination with a handle and a cross-head secured thereto, of teeth secured to the cross-head, a bar projecting through said teeth, a frame carried by the rake, arms pivotally connected to the frame in front of the cross-head and having their free ends projecting through eyes on said bar, and a sliding catch on the rake adapted to support the bar and arms in an elevated position.

In testimony whereof I have signed this specification in the presence of two subscribing witnesses.

LE GRAND TERRY.

Witnesses:
WM. E. TEW,
EDSON A. TILTON.